Dec. 14, 1954        E. G. ARELT        2,696,918
APPARATUS FOR HANDLING ARTICLES OF FLAT POTTERY WARE
Original Filed Jan. 20, 1950        8 Sheets-Sheet 1
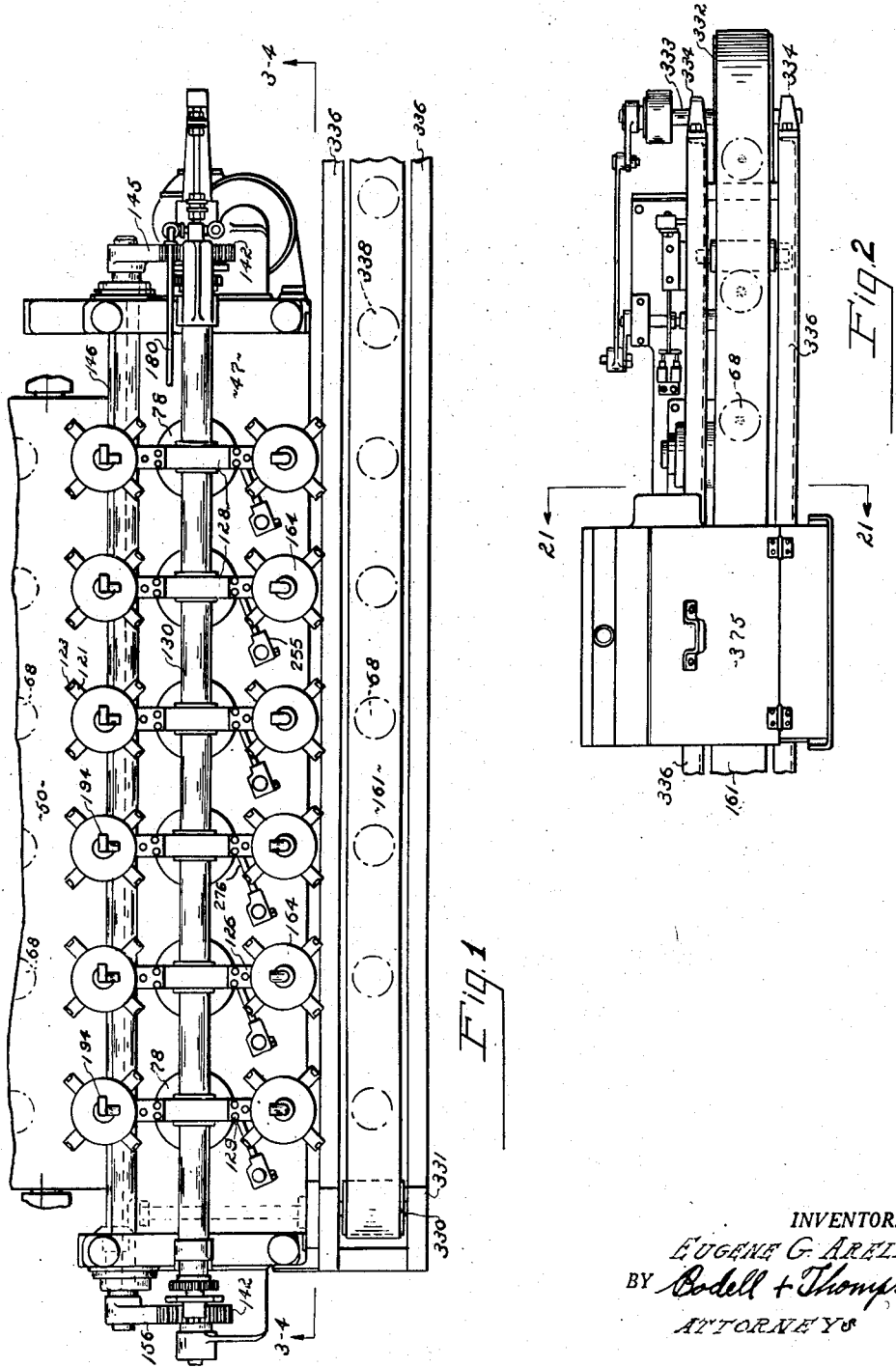
INVENTOR.
EUGENE G. ARELT
BY Bodell + Thompson
ATTORNEYS INVENTOR.
EUGENE G. ARELT
BY Bodell + Thompson
ATTORNEYS INVENTOR.
EUGENE G. ARELT
BY Bodell + Thompson
ATTORNEYS

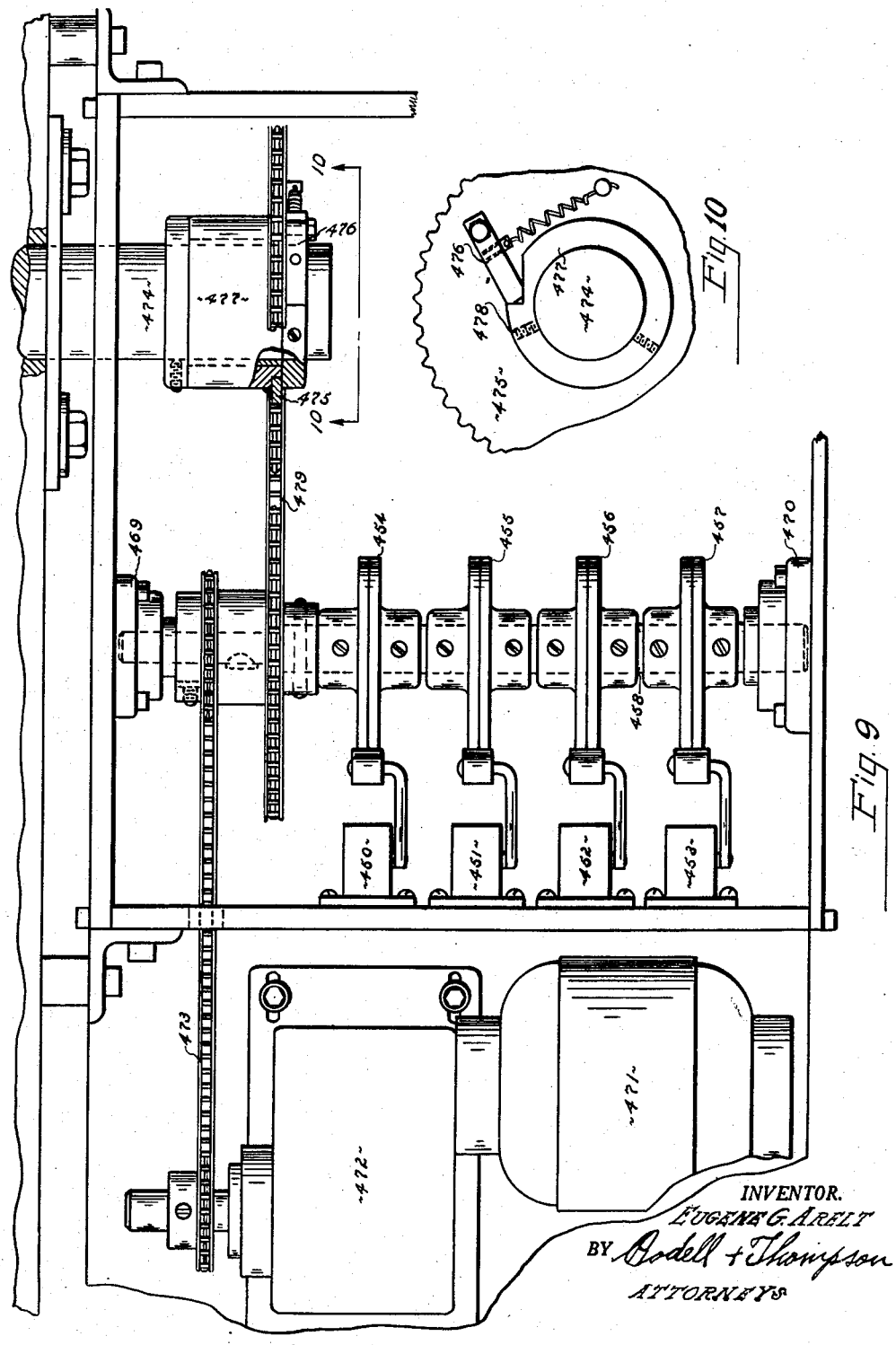

_United States Patent Office_    2,696,918
Patented Dec. 14, 1954

2,696,918

APPARATUS FOR HANDLING ARTICLES OF FLAT POTTERY WARE

Eugene G. Arelt, Baldwinsville, N. Y., assignor to Onondaga Pottery Company, Syracuse, N. Y., a corporation of New York Original application January 20, 1950, Serial No. 139,755, now Patent No. 2,608,738, dated September 2, 1952. Divided and this application January 9, 1952, Serial No. 265,613

2 Claims. (Cl. 214—1)

This invention has to do with apparatus for handling articles of flat pottery ware, such as plates, platters, saucers, etc., and more particularly, for handling such articles in the green, air dried, unfired, state.

This application is a division of my copending application, Ser. No. 139,755, filed January 20, 1950, now Patent No. 2,608,738, which is directed to a machine for automatically processing green, air dried, unfired, pottery ware in preparation for firing.

This invention has as an object apparatus of the type referred to embodying a structural arrangement which functions to grip a plurality of pieces of ware arranged in a row at the edge of the brim portion of the pieces and transfer the pieces of ware from one location to another, and to release the pieces of ware at the end of the transfer movement.

The invention has as a further object a transfer apparatus of the type referred to embodying a structure which functions to exert any desired pressure on the pieces of ware, the application of the pressure being applied gradually whereby the apparatus functions efficiently to handle particularly fragile pieces of ware without breaking the same.

The invention consists in the novel features and in the combinations and constructions hereinafter set forth and claimed.

In describing this invention, reference is had to the accompanying drawings in which like characters designate corresponding parts in all the views.

Figure 1 is a top plan view of a major portion of a machine embodying my invention.

Figure 2 is a top plan view of the portion of the machine immediately to the right of that shown in Figure 1.

Figure 9 is an elevational view of the timer shaft and driving mechanism for controlling the sequence of operations of the machine.

Figure 10 is a fragmentary view taken on line 10—10, Figure 9.

Figure 3:
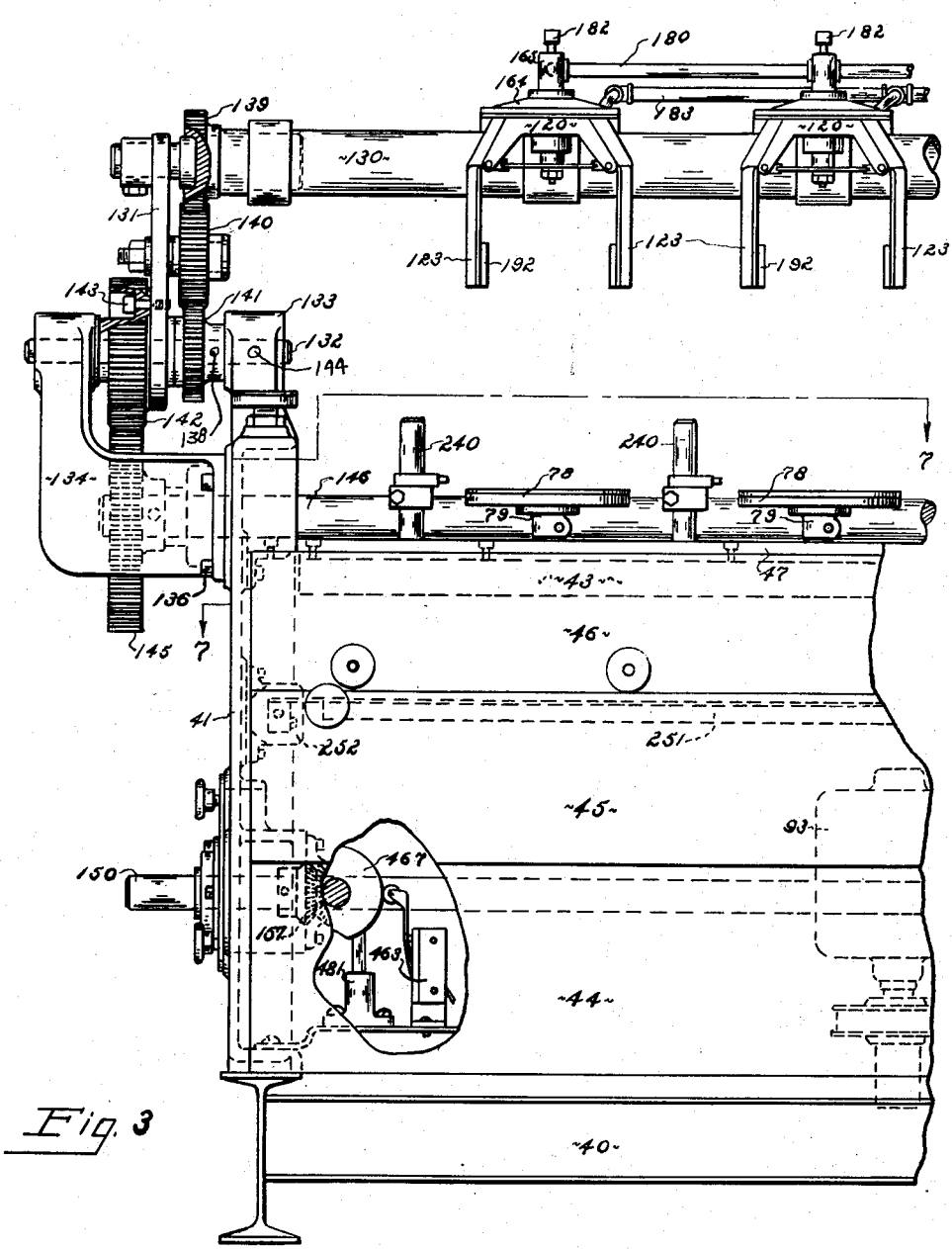
Figure 3 is a side elevational view of the left hand portion of the machine shown in Figure 1 looking upwardly and with the discharge conveyor omitted, as indicated by the line 3—4, 3—4.

The ware handling apparatus of this invention is here shown as a portion of a machine for automatically fettling or trimming ware and which consists generally of an in-feed conveyor, a discharge conveyor, and a plurality of vertically journalled ware rotating spindles arranged intermediate the conveyors.

In the embodiment shown, the ware transfer mechanism operates to simultaneously transfer a plurality of pieces of ware in a row from the in-feed conveyor to the fettling spindles and at the conclusion of the fettling operation to transfer the fettled ware to the discharge conveyor. The discharge conveyor is actuated intermittently to advance a procession of fettled pieces of ware from the apparatus.

The machine proper includes a frame structure mounted upon a base structure formed of I beams 40. The ends of the framework consists of plates 41, 42, extending upwardly from the base and connected by lengthwise extending members 43 secured at their ends to the plates 41, 42. The sides of the frame are covered with suitable plates 44, 45, 46, whereby the frame has the exterior appearance of a rectangular cabinet closed by a top plate 47. The top plate 47 is secured to the upright plates 41, 42, by angle members 48, and the top plate and side plate 46 are secured together by the angle members 43.

The first position from which the pieces of ware are transferred consists of a conveyor mounted on one side of the cabinet. This conveyor is in the form of a wide belt 50 extending the major portion of the length of the cabinet and being trained over a driving roll 51, Figure 5, affixed to a shaft 52. The shaft 52 is journalled at each end in suitable bearings.

The conveyor belt 50 is also trained over a suitable pulley or roll spaced outwardly from the machine. The pieces of ware shown in dotted outline at 68, Figure 1, are placed upon the conveyor belt in rows and suitable driving mechanism is operatively connected to the conveyor belt 50 for intermittently advancing the belt in timed relation to the transfer mechanism, as more fully disclosed and described in the copending application above referred to. Insofar as this application is concerned, the conveyor belt 50 functions to intermittently advance rows of ware toward and in juxtaposition to the cabinet containing the ware transfer and timing mechanism, thus providing a first position for a plurality of pieces of ware arranged in a row. In this instance, there are six pieces of ware and there are accordingly six transfer members for transferring the six pieces of ware in each row to the pads or turn tables 78, Figure 7, by which the pieces of ware are rotated for the fettling operation.

Figure 7:
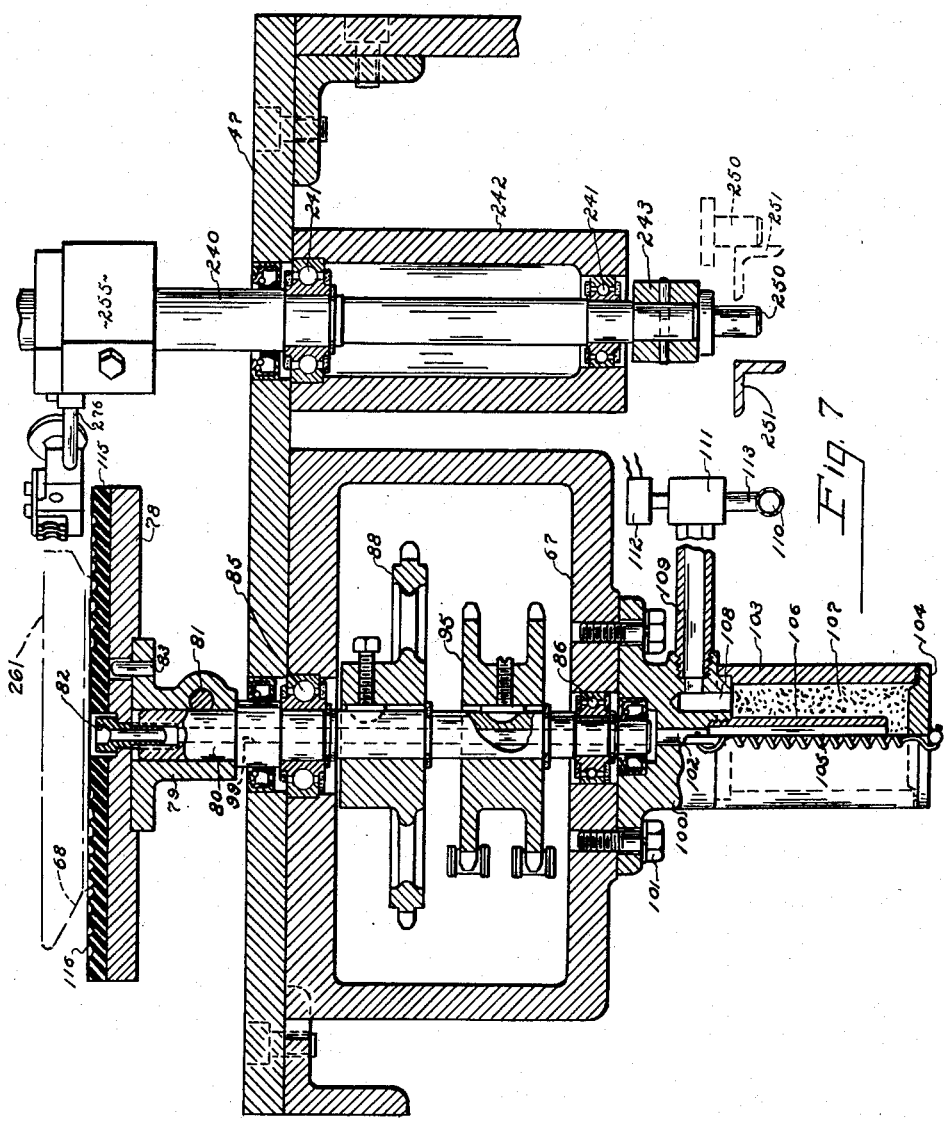
Figure 7 is a vertical sectional view of the third turn table spindle from the left, Figure 1, and contiguous parts of the frame.

The turn tables 78 are positioned on hub members 79 adjustably fixed to spindles 80 as by means of clamping screws 81, see Figure 7. The turn table plates 78 are clamped against the flange of the hub 79 by a hollow screw 82 threading into the end of the spindle and rotation of the hub is transmitted to the turn table by a dowel pin 83.

The spindles 80 are journalled vertically in bearings 85, 86 mounted in box shaped supports 67 secured to the under side of the top plate 47 of the machine cabinet. The spindles 80 are provided with sprockets as 88, 95, as shown in Figure 7, over which drive chains are trained to operatively connect the spindles together and to a driving motor indicated at 93, Figure 3, whereby the spindles are rotated in unison to effect rotation of the pieces of ware positioned upon the turn tables 78 during the fettling or trimming operation, and means is provided for holding the pieces of ware on the turn table during rotation thereof. The turn tables 78 provide the second position to and from which the pieces of ware are transferred by the ware transfer mechanism.

All of the spindles are formed with an axially extending passage 99, Figure 7. A member 100 is secured to the bottom wall of each of the supporting housings 67 as by screws 101. These members are formed with an axially extending passage 102 communicating with the passage 99 extending through the spindle. A depending cylindrical sleeve 103 is secured to each of the members 100 and is provided with a bottom closure 104 detachably secured thereto as by tension springs 105. A pipe 106 forms an extension of the passage 102 and terminates in proximity to the closure 104. The sleeve is filled with dust collecting material 107, such as oiled wool. The member 100 is formed with a passage 108 communicating with a pipe 109 which is connected to a header 110 through a valve 111 operated by a solenoid 112 and a pipe 113. The header 110 is connected to a vacuum pump through a main solenoid operated valve. The main valve and the individual valves 111 are opened to apply vacuum through the spindles 80 to fixedly secure the pieces of ware 68 to the turn table so that the pieces of ware will be rotated for the trimming or fettling operation.

A disk 115, Figure 7, of resilient material, such as rubber, is secured to the upper surface of each of the turn tables 78 and is preferably formed with a plurality of concentric grooves 116 to aid in fixedly securing the pieces of ware to the turn table by the vacuum means.

The pieces of ware 68, here shown in the form of flatware such as dinner plates, are transferred from the in-feed conveyor belt 50 to the turn tables 78 by apparatus disclosed in Figures 3, 4, 5, 6 and 8. This apparatus consists of a pair of ware gripping members for each piece of ware. The gripper members consist of a circular member 120, Figure 8, having four depending arms 121, each of which is bifurcated at its lower end to receive a ware gripping finger having a depending arm 123 and an inwardly extending arm 124. These fingers are pivotally mounted on the arms 121 as by pivot pins 125. Each of the members 120 is formed with a radially extending bracket 126 which are secured to the ends of supporting members 128 as by screws 129. These members 128 are fixed intermediate their ends to a tubular shaft 130, Figure 4, which extends lengthwise of the machine and is journalled at its ends in brackets 131 which, in turn, are journalled at their lower ends on shafts 132. The shafts 132 are mounted at their inner ends in bearings 133 and at their outer ends in brackets 134, 135. The bearings 133 are mounted on the upper ends of the end plates 41, 42, of the cabinet frame. The bracket 134 is attached to the end plate 41 as by screws 136 and the bracket 135 is attached to the end plate 42 as by screws 137. A spur gear 139 is fixed to each end of the tubular shaft 130 and is arranged in mesh with an idler gear 140 journalled on the brackets 131 and meshing with a gear 141 fixed to the shafts 132, as by pins 138. A gear 142 is journalled on the shafts 132 and is fixed to the brackets 131 as by screws 143, Figure 3. The shafts 132 are fixed in the bearing supports 133 and restrained from rotation by pins 144.

Figure 4:
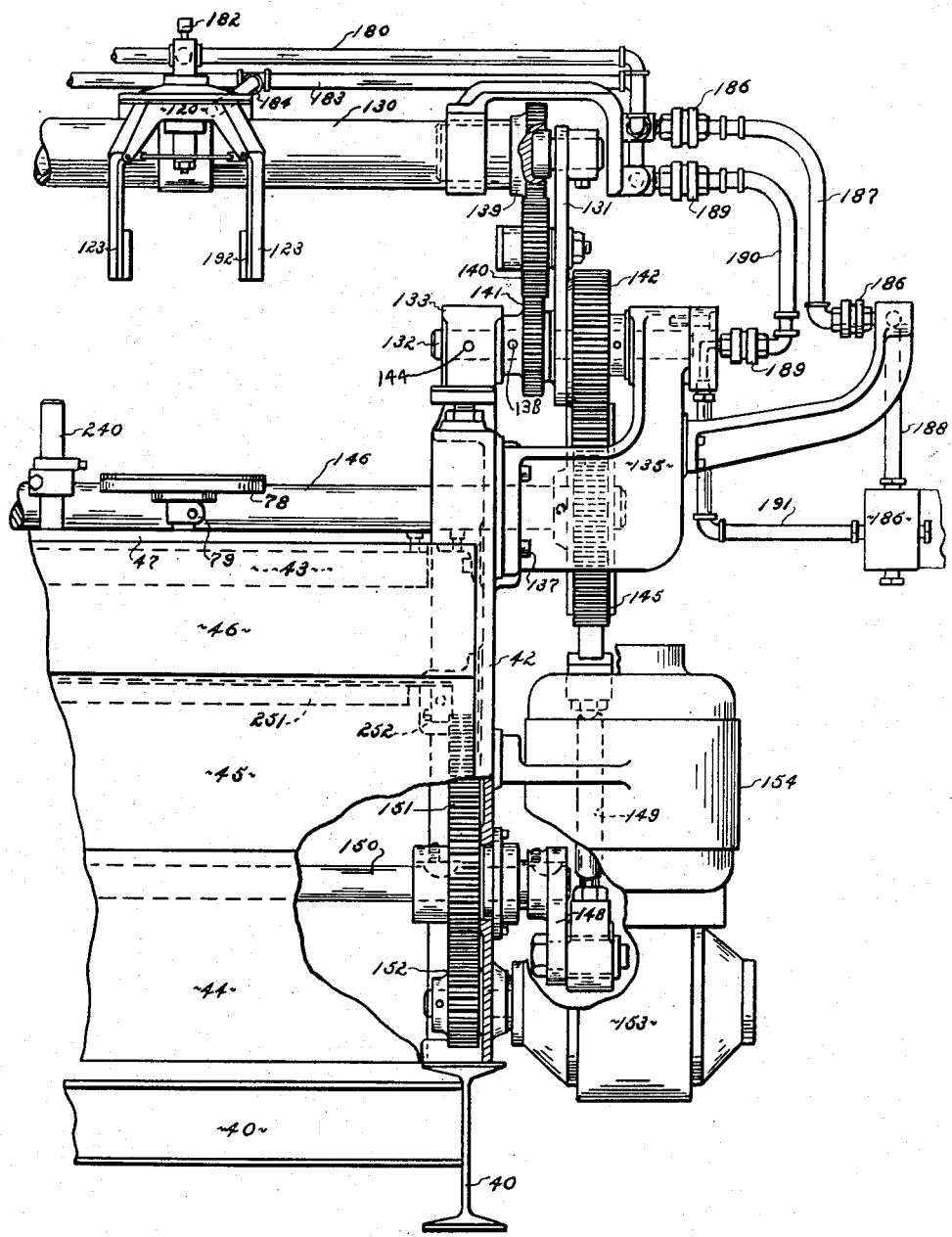
Figure 4 is a view, similar to Figure 3, of the right hand portion of the structure shown in Figure 1.
Figure 5:
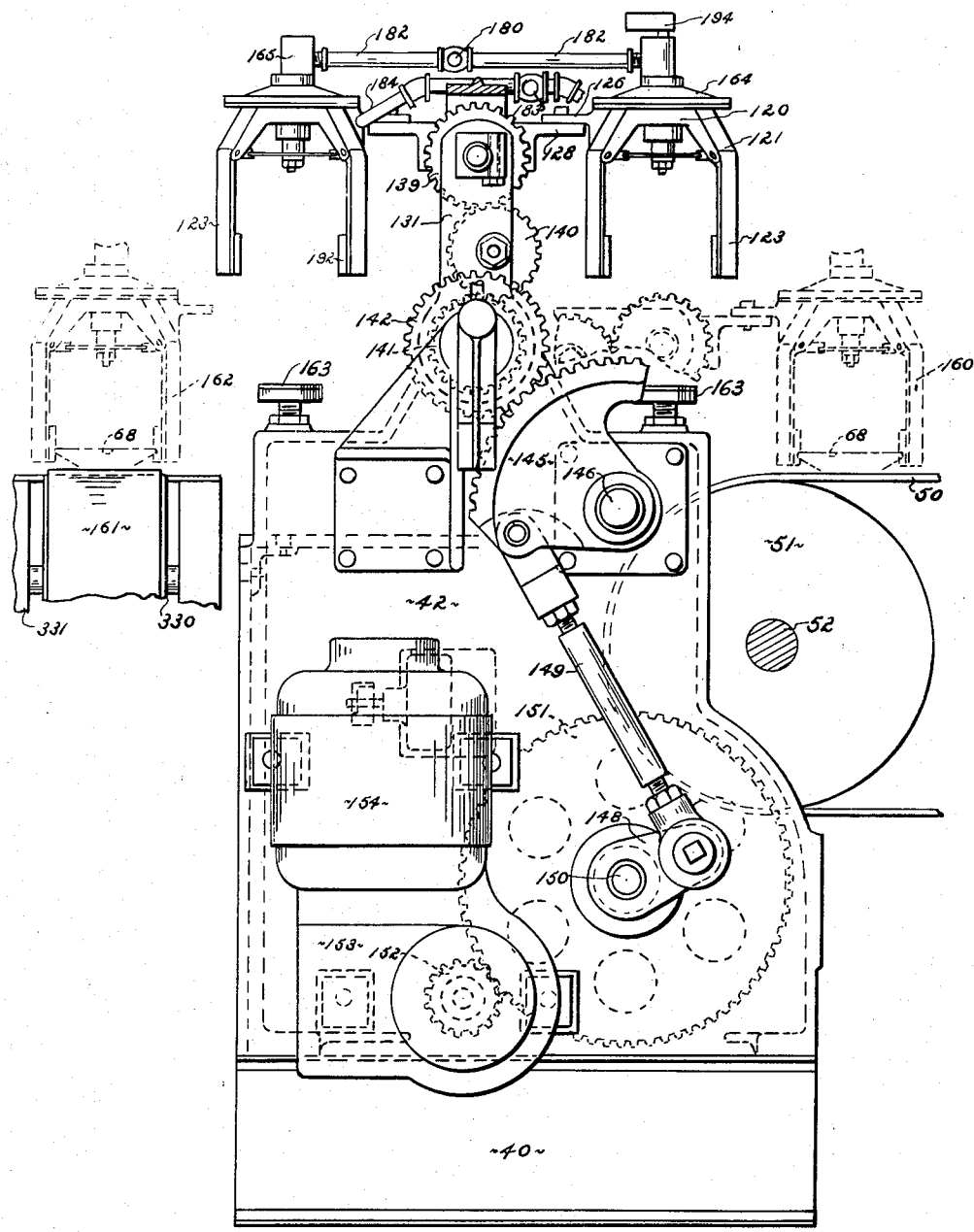
Figure 5 is an end elevational view of the structure shown in Figure 1, looking to the left of that figure.

The gears 142 are oscillated by a gear quadrant 145, Figures 4 and 5, fixed to a shaft 146 which also extends lengthwise of the cabinet and is journalled at its ends in the end plates 41, 42. The gear quadrant 145 is connected to a crank 148 by a link 149. The crank 148 is fixedly secured to a shaft 150, Figure 4, which also extends lengthwise of the machine and is journalled in the end plates 41, 42. This shaft has affixed to it a spur gear 151 arranged in mesh with a pinion 152 on the output shaft of a gear reducer 153 driven by a motor 154, see Figure 4. With this arrangement, the shaft 146 is oscillated whereby the gear 142 is oscillated through the quadrant 145. The shaft 146 is also provided with a quadrant 156 at its opposite end to mesh with the gear 142 fixed to the bracket 131.

As the gears 142 are oscillated, the brackets 131 are also oscillated through an arc of approximately 180°. However during this oscillation of the brackets, the supporting members 128 are maintained in horizontal position through the action of the gears 139, 140 and 141, at each end of the assembly. The result is that when the transfer mechanism is moved to the right, Figure 5, one set of ware grippers is arranged in juxtaposition to the in-feed belt 50, and the other set is arranged in alinement with the turn table 78, as indicated at dotted outline 160. When the transfer mechanism is oscillated to the left, Figure 5, the ware gripping members that were previously arranged in alinement with the turn tables is shifted into juxtaposition to the out-feed conveyor belt 161, as indicated in dotted outline 162, and the ware gripping members that were formerly in juxtaposition to the in-feed conveyor belt 50 are moved in registration with the turn-tables 78. Adjustable stop members 163 are threaded into the top of the end plates 41, 42, and serve as stops for, and which are engageable by, the transfer mechanism. These adjustable stops 163 determine the lowermost position of the transfer so that the gripping fingers 123 are accurately positioned relative to the pieces of ware on the conveyors 50—161, and on the turn tables 78.

Figure 8:
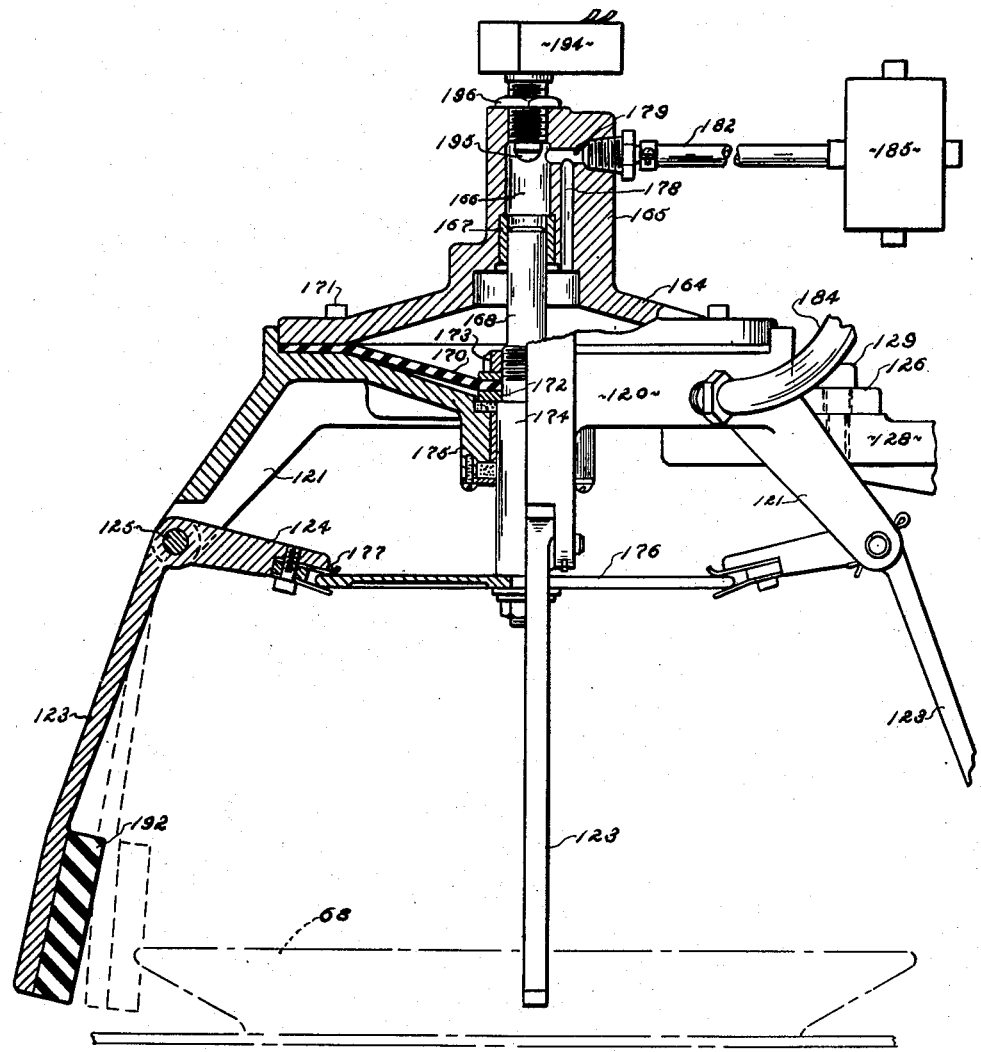
Figure 8 is a side elevational view, partly in section, of one of the ware grippers.

The detail structure of the ware gripping members is disclosed in Figure 8. The members 120 are formed with a central concavity over which is arranged a dished member 164 having a hub portion 165 formed with a central aperture 166 provided with a bushing 167 in which is slidably mounted a stem 168. The chamber formed between the members 120, 164, is partitioned by a flexible diaphragm 170, the peripheral margin of which is clamped between the members as by screws 171. The stem 168 is fixed centrally in the diaphragm by washers 172 and nut 173 threaded on the stem and acting against a shoulder formed by the lower enlarged portion 174 of the stem which is slidably mounted in a depending hub 175. The lower end of the stem has affixed to it a disk 176 and the inner ends of the arms 124 of the ware gripping fingers are provided with spaced flat spring members 177 between which the peripheral margin of the disk 176 is positioned.

The hub 165 is formed with a vertical passage 178 which communicates with a transversely extending passage 179 opening at one end into the bore 166 and being connected at its opposite end to a supply pipe 180, Figure 5, through a conduit 182. That portion of the chamber below the diaphragm 170 is connected to a supply pipe 183, Figure 4, through conduits 184. The supply pipes 180, 183, extend parallel above the shaft 130, the supply pipe 180 being connected to a valve 185 through rotary couplings 186, flexible conduits 187, 188. The supply pipe 183 is likewise connected to the valve 185 through couplings 189 and flexible pipes 190, 191.

The purpose of this arrangement is to apply pressure on either the upper or lower sides of the diaphragm 170. When pressure is applied on the upper side of the diaphragm through the supply pipe 180, the stem 168 and disk 176 is moved downwardly causing the arms 123 to move outwardly.

When pressure is applied through the pipe 183 to the under side of the diaphragm, the stem is moved upwardly and the fingers 123 moved inwardly. The lower ends of the fingers are provided with blocks 192 of soft resilient material, such as sponge rubber, so that when the fingers 123 are moved inwardly, the piece of ware 68 is gripped by the rim and as the mechanism is moved about the axis of the shafts 132, the ware is transferred from the in-feed conveyor belt 50 to the turn-tables 78 and from the turn-tables to the out-feed conveyor 161.

The solenoid operated valve 185 is controlled so as to supply fluid pressure to the top of the diaphragm as the transfer grippers are descending toward a piece of ware, or ready to move upwardly therefrom. As the grippers move over a piece of ware on the conveyor belt 50, or the turn-table 78, pressure is applied to the under side of the diaphragm, moving the fingers into engagement with the rim of the ware, and this pressure is maintained until the piece of ware has been transferred from the belt 50 to one of the turn tables, or from one of the turn-tables to the belt 161, whereupon the pressure is exhausted and pressure applied to the upward side of the diaphragm to move the fingers out of engagement with the piece of ware.

When a piece of ware has been transferred from the belt 50 to a turn-table 78, the main vacuum valve is opened and the valve 111 is opened to apply vacuum through the turn-table spindle 80 to hold the piece of ware on the turn-table. The motor 93 is energized, effecting rotation of the spindles and the fettling tool is moved radially inwardly to engage the trim to rim of the ware.

In the event a piece of ware is not moved to a turn-table 78, means is provided for not energizing the solenoid 112 of the valve 111 associated with that turn-table. In part, this means comprises a switch 194, Figure 8, fixed to the hub 165 of each of the transfer members and having an actuating stem 195 positioned in the upper end of the passage 66. The switch 194 is adjusted by the nut 196 so that the stem 195 will not be engaged by the stem 168 if the fingers 123 engage a piece of ware. However, if they do not engage a piece of ware or if after engaging the piece it should break, the stem 168 will move upwardly and engage the switch stem 195, opening the contacts of switch 194 which form part of the operating circuit for the individual solenoids 112, as will be hereinafter described. Accordingly, the absence of a piece of ware from one of the turn-tables 78 during the fettling operation, will not break the vacuum applied to the other turn-tables.

The edge of the pieces of ware is fettled by tools movable into engagement with the edge of the piece of ware while it is being rotated on the turn-table 78. The fettling tools 261 are mounted on the upper ends of shafts 240 journalled in bearings 241, Figure 7, mounted in a casing 242 secured to the under side of the top plate 47. The tools are carried by arms 276 extending from blocks 255 adjustably mounted on the upper ends of the shafts 240. Arms 243 are fixed to the lower ends of the shafts 240 and have depending portions 250 engaged by a bar 251.

The bar 251 is actuated in timed relation to the operation of the general machine and when actuated effects rotation of the shafts 240 to move the tools 261 carried thereby into engagement with the pieces of ware. The operation of the fettling tools is described in detail in the copending application referred to.

When the pieces of ware 68 have been fettled, they are automatically transferred to the discharge conveyor 161, see Figure 1, as previously described. This conveyor is also of the endless belt type and provides the third position to which the pieces of ware are transferred. The conveyor belt is trained over pulleys 330, 332, Figures 1 and 2. The pulleys are mounted upon shafts 333 journalled in bearings 334 carried by uprights 331. The belt travels between guide rails 336. This conveyor also is provided with drive mechanism for operating it intermittently in timed relation to the operation of the conveyor 50. In this instance, however, due to the fact that the conveyor 161 advances a single file procession of pieces of ware, it is advanced seven times in succession during the fettling operation in order to move the six pieces of ware transferred to it away from the machine. The drive mechanism for this conveyor 161 is partially shown in Figure 2 and more fully described in the copending application referred to.

In operation, a setter is placed upon the conveyor belt in position ahead of the six pieces of fettled ware as, for example, at the position indicated at 338, Figure 1. Upon the advancement of the conveyor, the setter is advanced under the dusting and cobbing apparatus described in my copending application, Ser. No. 139,755, the setter preceding the six pieces of ware. Accordingly, the setter is dusted and cobbed the same as the pieces of ware and as the ware advances from the dusting and cobbing apparatus toward the drum 332, an operator removes the setter from the conveyor and then removes each piece of ware as the conveyor advances and stacks the pieces of ware on the setter. This is the reason for advancing the conveyor seven steps in succession rather than six steps.

Figure 6:
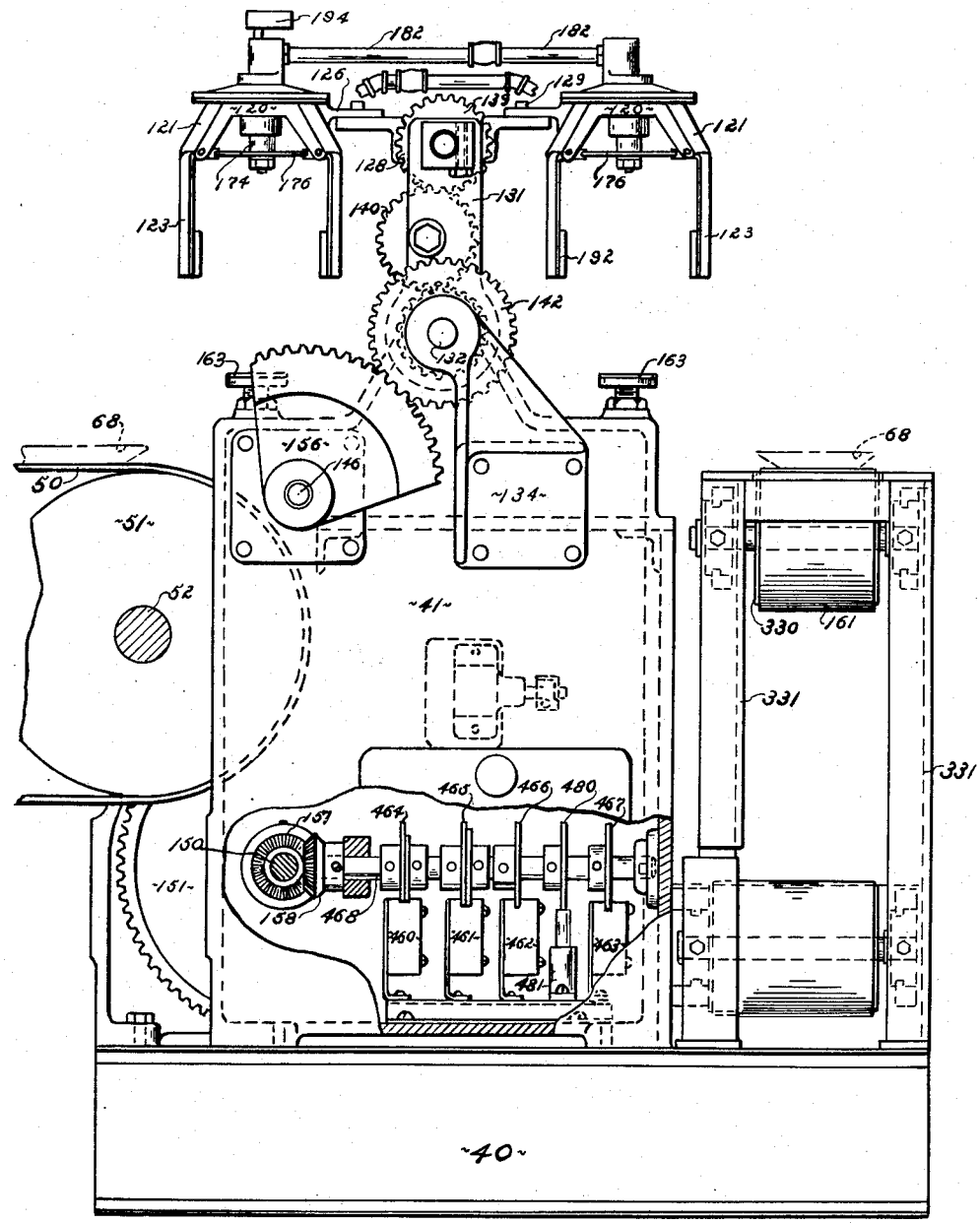
Figure 6 is an end elevational view looking to the right, Figure 1, with parts broken away.

The various operations performed by the machine are controlled by a series of switches 450, 451, 452, 453, Figure 9, which are actuated by cams 454, 455, 456 and 457, respectively, mounted on a shaft 458, and by a second group of switches 460, 461, 462, 463, Figure 6, operated by cams 464, 465, 466 and 467, respectively. These latter cams are mounted on a cam shaft 468 driven from the shaft 150 through beveled gears 157, 158, Figure 6.

The cam shaft 458 controlling the switches 450—453 is journalled in bearings 469, 470, mounted outside the frame structure of the machine, see Figure 9. This shaft 458 may be driven by a motor 471 through a gear reduction 472 and a chain 473 or, it may be driven from a shaft 474 extending from the jigger or ware forming machine through an over-running clutch or ratchet mechanism. As shown in Figures 9 and 10, a sprocket 475 is rotatably journalled upon the shaft 474 and carries a pawl 476 urged into a notch formed in a driving collar 477 secured to the shaft, as by set screws 478, the sprocket 475 being operatively connected to a sprocket affixed to the cam shaft by means of a chain 479. In either event, the shaft 458 is rotated one revolution for the production of six pieces of ware by the ware forming machine, or one revolution for the formation of the number of pieces of ware arranged on each row on the in-feed conveyor belt 50.

Assuming that a row of ware has been advanced by the belt 50 into juxtaposition with the cabinet portion of the machine, cam 457 actuates switch 453 completing an energizing circuit for the transfer motor 154. This motor actuates the transfer mechanism to move the ware transfer members 121 on the side of the machine toward the in-feed conveyor 50 into registration with the pieces of ware on the conveyor. As the lower ends of the fingers 123 are positioned about the pieces of ware, a cam 480 actuates an air valve 481, Figure 6, which, in turn, operates the four-way valve 185 to admit air to the header 183 and through the conduits 184 to the under side of the diaphragm 170, causing the stem 174 to move upwardly and the fingers 123 to move inwardly and grasp the rims of the pieces of ware. The transfer members are then moved upwardly and laterally to position the pieces of ware on the turn-tables 78, at which time the cam 480 again actuates the valve 481 to effect operation of the valve 185 to exhaust the air from the under side of the diaphragms 170 and to apply air on the upper side thereof, causing the fingers 123 to move outwardly and release the pieces of ware. Simultaneously with this latter operation, cam 466 actuates switch 462 to energize the main vacuum valve to supply vacuum to the header 110 and to the turn-table spindles 80 through the individual valves 111. However, as previously explained, if when a transfer member arrives in juxtaposition to a turn-table it does not have a piece of ware, the stem 168 has opened switch 194 and these switches are connected in series with the respective individual solenoids 112. With this arrangement, vacuum is supplied to each spindle on the turn-table on which there has been deposited a piece of ware.

Immediately upon the application of vacuum to the spindle, cam 456, Figure 9, actuates switch 452 to energize the spindle drive motor 93 for a predetermined period of time and during rotation of the spindles, cam 455 actuates switch 451 which effects actuation of mechanism to move the trimming tools into engagement with the pieces of ware. At the end of the trimming operation, the switches 451, 452, are again actuated to effect movement of the tools away from the ware and to deenergize the spindle drive motor 93.

The cam 467 actuates switch 463 controlling the circuit to the main vacuum valve to cause this valve to disconnect the source of vacuum to the header 110 and to connect the latter to atmosphere as soon as the spindle turn-tables 78 have stopped rotating.

Previous to the energization of motor 93, the transfer motor 154 continued its operation and moved the transfer members to the upper rest position disclosed in Figures 5 and 6. The motor 154 is stopped with the transfer members in this position with the actuation of switch 460 by cam 464. During rotation of the spindles 80, switch 450 is closed by cam 454, furnishing a circuit to the drive motor of conveyor 50, causing the conveyor 50 to advance one step by means of its intermittent drive. This advancement of the conveyor 50 brings another row of ware into juxtaposition with the cabinet portion of the machine. Also during the trimming operation, the discharge or outgoing conveyor 161 has been actuated seven successive steps forwardly. The machine functions in repetition of the cycle just described, whereby the air dried ware is automatically placed upon the turn-table 78, the edge of the ware fettled, the fettled ware automatically transferred to the conveyor 161 and advanced from the machine by that conveyor.

What I claim is:

1. Mechanism for transferring a row of round, flat articles of unfired pottery ware from a first position forwardly to a second position, and simultaneously transferring a row of such articles from said second position forwardly to a third position, said mechanism comprising a pair of spaced apart arms pivotally mounted at like ends on the frame for movement about an axis extending in registration with and above the row of articles in said second position, an elongated support pivotally mounted at its ends to the opposite ends of said arms and extending parallel to the rows of articles and said axis, a row of article gripping devices mounted along each side of said support, power means for simultaneously moving said arms about their pivots to effect movement of the support in an arcuate path about said axis and to move said article gripping devices in registration with the articles positioned at said first and second stations and thence reversely to move said gripping devices in registration with articles positioned in the second and third positions, means operable to maintain said gripping devices in ware grippng engagement wth the articles of ware during said arcuate movement, and motion transmitting means cooperable with the frame and said support for restraining the latter against rotation about its own axis during said arcuate movement.

2. Mechanism for transferring a row of round, flat articles of unfired pottery ware from a first position forwardly to a second position, and simultaneously transferring a row of such articles from said second position forwardly to a third position, said mechanism comprising a pair of spaced apart arms pivotally mounted at like ends on the frame for movement about an axis extending in registration with and above the row of articles in said second position, an elongated support pivotally mounted at its ends to the opposite ends of said arms and extending parallel to the rows of articles and said axis, a row of article gripping devices mounted along each side of said support, a power shaft journalled in the frame and extending parallel to said support, motion transmitting members connecting said arms to the ends of said shaft for simultaneous movement of said arms about their pivots upon oscillation of the shaft to effect movement of the support in an arcuate path about said axis and to move said article gripping devices in registration with articles of ware positioned at said first and second stations and thence reversely to move said gripping devices in registration with articles positioned in said second and third positions, means operable to maintain said gripping devices in ware gripping relation to the pieces of ware during such arcuate movement, and motion transmitting members cooperable with the frame and said support for restraining the latter against rotation about its own axis during said arcuate movement thereof.

References Cited in the file of this patent

UNITED STATES PATENTS

| Number | Name | Date |
|---|---|---|
| 554,020 | Dehaitre | Feb. 4, 1896 |
| 1,351,493 | Sigmond | Aug. 31, 1920 |
| 1,766,549 | Schroder | June 24, 1930 |
| 1,869,622 | Rowe | Aug. 2, 1932 |
| 1,933,226 | Smith et al. | Oct. 31, 1933 |
| 2,118,991 | Turechek et al. | May 31, 1938 |
| 2,431,265 | Madsen et al. | Nov. 18, 1947 |